United States Patent [19]

Kontz

[11] 4,364,896
[45] Dec. 21, 1982

[54] METHOD FOR MAKING A MULTI-LAYERED BLOWN PLASTIC CONTAINER

[75] Inventor: Robert F. Kontz, Toledo, Ohio
[73] Assignee: Owens-Illinois, Inc., Toledo, Ohio
[21] Appl. No.: 303,759
[22] Filed: Sep. 21, 1981
[51] Int. Cl.³ .......................... B29C 17/07; B29D 9/00
[52] U.S. Cl. ...................................... 264/513; 425/523
[58] Field of Search .......................... 264/513; 425/523

[56] References Cited

U.S. PATENT DOCUMENTS 3,878,282 4/1975 Bonis et al. ........................... 264/513
4,267,143 5/1981 Roullet ............................ 264/513 X

*Primary Examiner*—Jan H. Silbaugh
*Attorney, Agent, or Firm*—Richard D. Heberling; Myron E. Click; David H. Wilson

[57] ABSTRACT

A multi-layered blown plastic container is formed by injection molding a first thermoplastic parison, axially stretching the first parison at its orientation temperature, injection molding a second thermoplastic parison around the first parison, and blowing the multi-layered parison at its orientation temperature to provide an oriented container, the inner layer being oriented in the axial and hoop directions, and the outer layer oriented in the hoop direction.

11 Claims, 4 Drawing Figures

METHOD FOR MAKING A MULTI-LAYERED BLOWN PLASTIC CONTAINER

THE INVENTION

The present invention is directed to a method and apparatus for making an oriented hollow blown plastic container. The invention is more particularly related to a method of making a multi-layered hollow oriented plastic container.

It is an object of the present invention to provide a method of making a multi-layered hollow blown plastic container comprising the steps of:

(A) injection molding a first parison of thermoplastic material, (B) axially stretching the parison at its orientation temperature to provide a parison that is oriented in the axial direction, (C) injection molding at least a second thermoplastic parison around the stretched first parison to form a multi-layered parison, (D) bringing the multi-layered parison to orientation temperature; and (E) blowing the multi-layered parison to form a multi-layered oriented hollow plastic container in which the inner layer is oriented in the axial direction and the hoop direction, and the outer layer is oriented in the hoop direction.

It is an object of the present invention to provide a multi-layered oriented hollow plastic container in which the inner layer is made of polyethylene terephthalate and is oriented in the axial direction and the hoop direction, and the outer layer is made of polyvinylidene chloride and is oriented in the hoop direction.

These and other objects will become apparent from the specification and claims that follow and the drawings in which:

The present invention provides a method and apparatus for making a multi-layered oriented hollow plastic container, the method comprising the steps of:

(A) injection molding a first parison of thermoplastic material such as polyethylene terephthalate, (b) axially stretching the parison at orientation temperature to provide axial orientation to the parison, (C) injection molding at least a second thermoplastic parison of a thermoplastic such as polyvinylidene chloride around a stretched first parison to form a multi-layered parison, (D) bringing the multi-layered parison to orientation temperature; and (E) blowing the multi-layered parison to form a multi-layered oriented hollow plastic container in which the first layer is oriented in the axial direction and the hoop direction and the outer layer is oriented in the hoop direction.

The present invention also provides an apparatus for blow molding an oriented multi-layered hollow plastic container comprising:

(A) a first station having injection molding means for providing a first thermoplastic parison, (B) a second station having means for stretching the first parison axially and a second injection molding means for injection molding a second thermoplastic parison around the first stretched parison to provide a two-layer parison, (C) a third station for blow molding the two-layer parison at its orientation temperature, and (D) a fourth station for ejecting the finished blown container.

Figure 1:
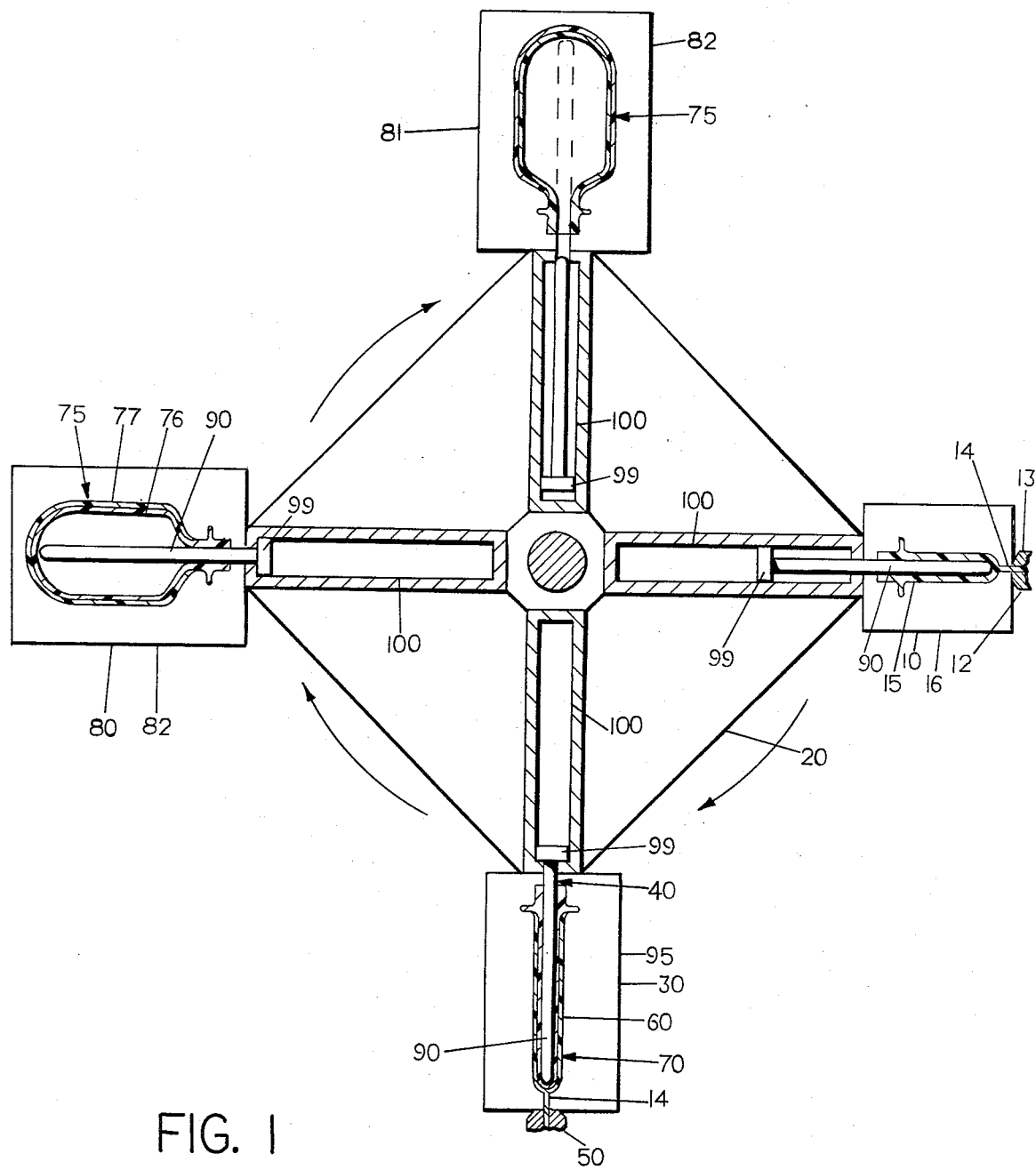
FIG. 1 is a diagrammatic top plan view illustrating the method of the present invention and the four station blow molding machine of the present invention, with some parts being shown in section.

The blow molding apparatus of the present invention as shown in FIG. 1 comprises a first station 10 having injection molding means 12 including an extruder nozzle 13 and a channel 14 for providing a first thermoplastic parison 15 such as one of substantially amorphous polyethylene terephthalate in a mold 16. The apparatus comprises preferably a horizontal indexing turret head 20 which indexes to three other stations after the first station 10. The apparatus can also be one that operates in a vertical plane.

As best seen in FIG. 1, a second station 30 is provided which has means for stretching the first parison axially 40 to form a stretched parison 45 and a second injection molding means 50 for injection molding a second thermoplastic parison 60 such as one of polyvinylidene chloride around the first stretched parison 45 to provide a two-layered parison 70.

A third station 80 is provided for blow molding the two-layered parison at its orientation temperature in a blow mold 82 to provide a final oriented hollow plastic container 75, having an inner layer 76 that is oriented in the axial direction and the hoop direction and an outer layer 77 that is oriented in the hoop direction, as is well known in the art, blow air can conveniently be supplied to the interior of the parison through an axial air passage inside the core pin.

A fourth station 81 is provided for ejecting the finished blown container 75. In the method and apparatus of the present invention, a core pin 90, upon which the parisons travel throughout the indexing operation, is a combination of a core pin to carry the parisons throughout, a stretch pin (as seen in Station 2), and a blow pin (as seen in Station 3). The combination core pin, stretch pin and blow pin can be seen in detail on an enlarged scale as in FIGS. 2, 3, and 4.

Figure 4:
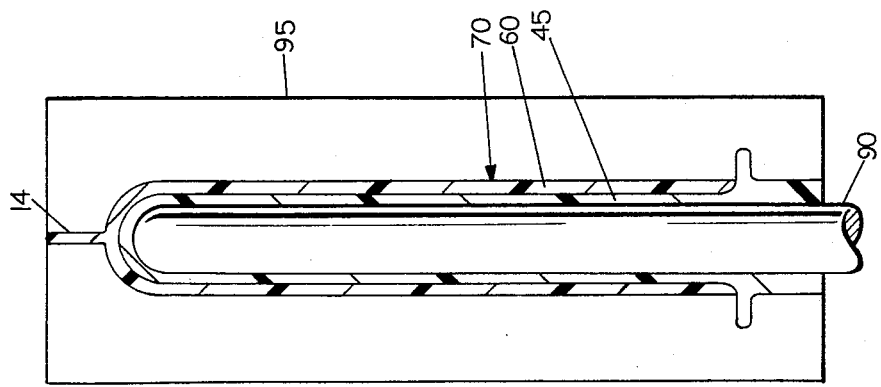
FIG. 4 is a schematic top plan view of the second station showing two layer parison in section.
Figure 3:
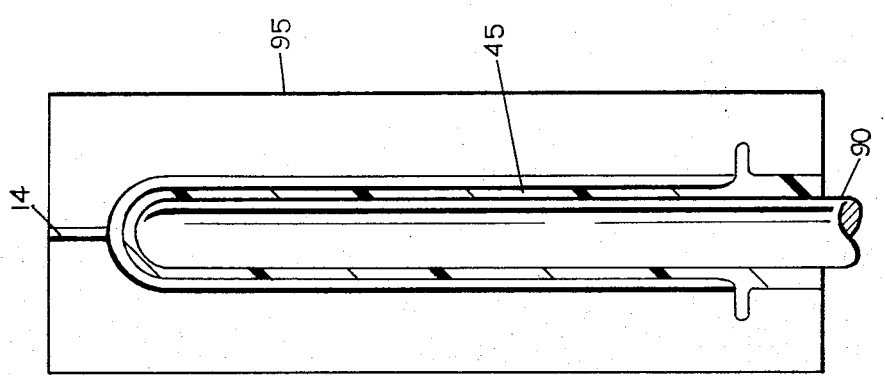
FIG. 3 is a schematic top plan view of the second station showing the stretched first injection molded parison in section.

In Station 2, the first injection molded parison is carried from Station 1 by the core pin 90 to a mold 95. In Station 2 (as best seen in FIG. 3) the core pin is moved axially to stretch the parison to form a stretched parison. As seen in FIGS. 1 and 3, a hydraulic activated cylinder or rod 99 moves within the cylindrical bore 100 to stretch the first parison at its orientation temperature to provide the stretched parison. Thereafter, still at Station 2, a parison is injection molded around the first stretched parison to provide a two-layered parison as seen in FIG. 4. Then as previously explained, the stretched parison is blown at Station 3 to form the two-layered oriented hollow plastic article 75 and indexed to Station 4 where the hollow plastic bottle is ejected, the core pin moving away from the bottom of the container whereby the bottle drops from the pin by gravity.

The two-layered parison is generally of such a size that its wall thickness is about 60 to 180 mils, especially when the final container has a volume of about 1 to 2 liters or more, up to as high as 3 to 4 liters. The wall thickness of each of the layers of the two-layered parison is such that each layer is preferably about 40–60% of the total thickness and generally about 30–70% of the total thickness.

The final container is generally such that the wall thickness is about 8 to 30 mils for containers ranging from about one-half liter up to about 2 to 3 liters. The preferred material for one of the layers such as the inner layer or first injection mold parison is polyethylene terephthalate (PET) with an inherent viscosity of about 0.6 to 1.1. The orientation temperature of PET, as is known in the art, is about 70°–110° C. for best results. The orientation temperature of thermoplastic materials is generally well known, and the orientation temperature for orienting the first injection mold parison by axially stretching should be somewhere in the middle of its orientation range for best practical results. As to the orientation temperature for blowing the final two-layered parison to form a blown container, inasmuch as the orientation temperatures of each of the different polymers vary somewhat, the temperature should be an average orientation temperature for the two materials so that both layers can become oriented in the hoop direction.

Thermoplastic polymers suitable for use in the present invention, especially for the first injection molded parison, are polyethylene, polypropylene, polyvinyl chloride, nitrile polymers, polyethylene terephthalate, polycarbonate, polymethyl methacrylate, and nylon. Suitable polymers for the second injection molded parison, although they can also be used as the first injection molded parison, include good barrier polymers such as polyvinylidene chloride. The barrier polymers are less permeable to $CO_2$ and $O_2$ than the other polymers. For instance, polyvinylidene chloride much less permeable to $CO_2$ and $O_2$ than is polyethylene or polypropylene. Other polymers that can be included as a barrier layer include co-polymers of vinylidene chloride with vinyl chloride or vinyl alcohol or vinyl acetate or styrene. Polyvinyl alcohol or polyvinyl acetate and co-polymers of vinyl alcohol and vinyl acetate can be used. A suitable polymer is a hydrolyzed ethylene vinyl acetate co-polymer. Also co-polymers of vinylidene chloride and acrylonitrile can be used.

Figure 2:
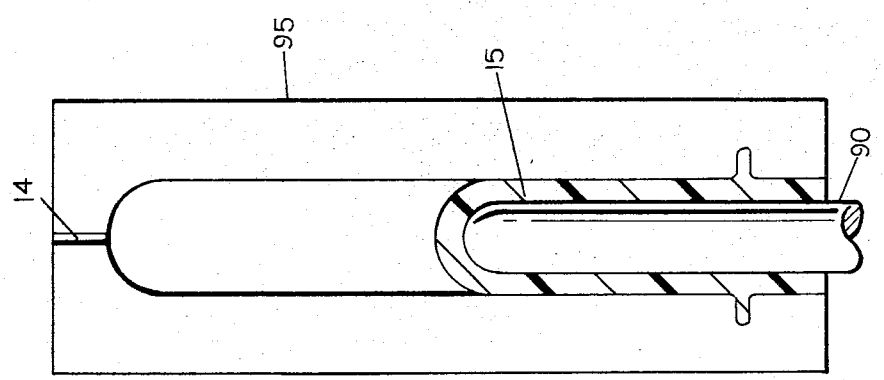
FIG. 2 is a schematic top plan view of the second station showing the first injection molded parison in section.

The amount of stretching of the parison in the axial direction at Station 2 is preferably at least about 40% of its length, and best results are obtained with about 50–150% or more of its original length. In other words, the parison can be stretched (100%) to double its length for good results. As illustrated in FIGS. 2 and 3, when the first injection molded parison is stretched axially to about double its length, the wall thickness of the stretched parison is reduced to about one half of its original wall thickness.

A great advantage is obtained by having different oriented layers. By the method of the present invention, the layers can be oriented at a different time in the process and the orientation can be in different directions.

What is claimed is:
1. A method of making a hollow blown plastic container comprising the steps of:
   A. injection molding a first parison of thermoplastic material,
   B. bringing the temperature of the first parison to its orientation temperature and axially stretching the parison,
   C. injection molding at least a second thermoplastic parison around the stretched first parison to form a multi-layered parison,
   D. bringing the multi-layered parison to orientation temperature, and
   E. blowing the multi-layered parison at the orientation temperature of Step D to form a multi-layered oriented hollow plastic container in which the inner layer is oriented in the axial direction and the hoop direction and the outer layer is oriented in the hoop direction.
2. A method as defined in claim 1 in which the first parison is made of polyethylene terephthalate.
3. A method as defined in claim 1 in which the second parison is made of polyvinylidene chloride.
4. A method as defined in claim 1 in which the first parison is made of polyethylene terephthalate and the second parison is made of polyvinylidene chloride.
5. A method as defined in claim 1 in which the first parison is made of polyethylene terephthalate, the axial stretching of the parison is at least about 40% in Step B, and the temperature for orientation of the multi-layered parison is about 65° C. to 120° C.
6. A method as defined in claim 1 in which the first parison is made of polyethylene terephthalate, the second parison is made of polyvinylidene chloride, and the wall thickness of each parison being about 50–100 mils.
7. A method as defined in claim 1 in which the first parison is made of polyethylene terephthalate and the second parison is made of material less permeable to $CO_2$ and $O_2$ than polyethylene terephthalate.
8. A method as defined in claim 1 in which the thermoplastic material of the first parison is polyethylene.
9. A method as defined in claim 1 in which the material of the first parison is polyvinyl chloride.
10. A method as defined in claim 1 in which the material of the first parison is polypropylene.
11. A method as defined in claim 1 in which the material of the first parison is a nitrile polymer.

* * * * *